(12) United States Patent
Higuchi et al.

(10) Patent No.: US 8,285,400 B2
(45) Date of Patent: Oct. 9, 2012

(54) DIGITAL CONTROLLER FOR CONTROLLING OUTPUT VOLTAGE UNDER LARGE VARIATIONS IN LOAD AND SUPPLY VOLTAGE

(75) Inventors: Kouji Higuchi, Chofu (JP); Kazushi Nakano, Chofu (JP); Tatsuyoshi Kajikawa, Chofu (JP); Eiji Takegami, Tokyo (JP); Kazushi Watanabe, Tokyo (JP); Satoshi Tomioka, Tokyo (JP)

(73) Assignee: TDK-Lambda Corporation, Tokyo (JP)

( * ) Notice: Subject to any disclaimer, the term of this patent is extended or adjusted under 35 U.S.C. 154(b) by 445 days.

(21) Appl. No.: 12/518,488

(22) PCT Filed: Dec. 11, 2007

(86) PCT No.: PCT/JP2007/073845
§ 371 (c)(1),
(2), (4) Date: Jan. 11, 2010

(87) PCT Pub. No.: WO2008/072618
PCT Pub. Date: Jun. 19, 2008

(65) Prior Publication Data
US 2010/0114399 A1    May 6, 2010

(30) Foreign Application Priority Data
Dec. 12, 2006   (JP) .................................. 2006-334415

(51) Int. Cl.
  *G05B 13/02* (2006.01)
  *G05B 11/01* (2006.01)
  *G05B 19/29* (2006.01)
(52) U.S. Cl. ................ 700/45; 700/37; 700/38; 700/71; 318/600; 318/628
(58) Field of Classification Search .................... 700/28, 700/32, 37, 38, 44, 45, 71; 318/560, 561, 318/563, 600, 628
See application file for complete search history.

(56) References Cited

U.S. PATENT DOCUMENTS
4,894,598 A * 1/1990 Daggett .................. 318/568.16
(Continued)

FOREIGN PATENT DOCUMENTS
JP        09322529        12/1997
(Continued)

OTHER PUBLICATIONS

Design of a Robust PWM Power Amplifier Using Approximate Two-Degree-of Freedom Digital Integral-Type Control Only with Voltage Feedback, Denshi Joho Tsushin Gakkai Ronbunshi, vol. J-85-C, No. 10, pp. 905-916.

(Continued)

*Primary Examiner* — Crystal J Barnes-Bullock
(74) *Attorney, Agent, or Firm* — Schwabe, Williamson & Wyatt, P.C.

(57) ABSTRACT

There is provided a digital controller which can reduce a variation in output voltage as compared to the conventional digital controller at the time of abrupt changes in load and in input of a power amplifier. The digital controller is built in the power amplifier for supplying an output voltage $v_o$ to a load and is equipped with a manipulated variable calculating unit which detects the output voltage $v_o$ to calculate a manipulated variable $\xi_1$ and a signal generating unit which converts the manipulated variable $\xi_1$ into a signal for making the power amplifier operate. A feedforward function from an equivalent disturbance qy caused by the variation in the load is replaced by a feedback function from the output voltage $v_o$ and the manipulated variable $\xi_1$, thereby allowing a transfer characteristic from the disturbance qy to the output voltage $v_o$ to result in a quadratic differential characteristic. Consequently, the variation in output voltage can be reduced as compared to the conventional controller at the time of the abrupt changes in the load and in the input of the power amplifier.

9 Claims, 4 Drawing Sheets

U.S. PATENT DOCUMENTS

| | | | |
|---|---|---|---|
| 4,912,753 A * | 3/1990 | Evans, Jr. | 700/245 |
| 6,683,494 B2 * | 1/2004 | Stanley | 330/10 |
| 7,620,462 B2 * | 11/2009 | Higuchi et al. | 700/37 |

FOREIGN PATENT DOCUMENTS

| | | |
|---|---|---|
| JP | 2001520500 | 10/2001 |
| JP | 2006050723 | 2/2006 |

OTHER PUBLICATIONS

Robust Control of DC-DC Converter by Good Approximate 2-Degree-of-Freedom System, Denshi Joho Tsushin Gakkai Ronbunshi, vol. J-85-C, No. 10, pp. 905-916.

* cited by examiner

DIGITAL CONTROLLER FOR CONTROLLING OUTPUT VOLTAGE UNDER LARGE VARIATIONS IN LOAD AND SUPPLY VOLTAGE

RELATED APPLICATIONS

This is a national stage entry of, and claims priority to, International Application PCT/JP2007/073845, titled "DIGITAL CONTROLLER," filed 11 Dec. 2007, which claims priority to Japanese application No. 2006-334415, titled "DIGITAL CONTROLER" (English translation), filed 12 Dec. 2006, the entire contents of which are hereby incorporated by reference.

TECHNICAL FIELD

The present invention relates to a digital controller built in a power amplifier or the like such as a switching regulator to control an output voltage supplied to a load, and more particularly, to a digital controller which can independently meet an extensive variation in load as well as a variation in power supply voltage.

BACKGROUND ART

An electric power supply, which uses a pulse width modulation (PWM) switching circuit as an electric power conversion circuit, and includes an LC filter interposed between the electric power conversion circuit and a load in order to eliminate noises as well as a feedback control system configured to make the output voltage fed to the load proportional to a command signal, is in use. At this time, a characteristic of the load encompasses a broad range from a capacitive load to an inductive load and substantially varies from zero to a maximum rating in magnitude. Therefore, such a robust PWM electric power supply is required that can meet both such an extensive variation in load and a variation in DC power supply voltage with a single controller.

In the PWM electric power supply like this, an amount of a feedback signal is preferably small for the sake of reducing an influence of noises on a controller and since a current detection sensor is generally expensive, a controller using only a voltage feedback network is desirably realized.

Then, a robust digital controller design method which can meet the requirements described above and is used in a PWM electric power supply has been proposed in a nonpatent document 1.

The digital feedback control system incurs a longer input dead time than does an analogue feedback control system. This input dead time is attributable mainly to a calculation time delay of a DSP, an analog-to-digital (AD) conversion time delay, a digital-to-analog (DA) conversion time delay, a delay in a triangular wave comparator, etc. The nonpatent document 1 focuses on these delays, expressing controlled objects (a PWM signal generator, a power conversion circuit and an LC filter) by a discrete-time system with two-orders higher than a continuous time system, in view of the input dead time and the conversion of a current feedback into a voltage feedback, and then proposing a configuration of a state feedback system which is intended to attain a given target characteristic with respect to the discrete-time system. Besides, in the nonpatent document 1, when after having equivalently converted the state feedback system into an output feedback system using only voltage, a robust compensator which is obtained by approximating this output feedback system is connected, whereby an approximately two-degree-of-freedom digital robust control system can be configured. Besides, by equivalently converting this robust digital control system, a digital integral controller using only the voltage feedback can be obtained.

In the nonpatent document 1, a method for configuring an approximately two-degree-of-freedom robust control system is shown which is intended to realize a first-order approximate model. In a robust digital controller incorporated with the control system like this, however, it has been difficult to curb a control input at the same time as increasing a degree of approximation. Therefore, it has been required to provide a design device of a robust digital controller whose magnitude of the control input does not need to be considered by anyone with a high degree of approximation maintained.

With respect to the two-degree-of-freedom robust digital control system proposed in the nonpatent document 1, a definite parameter determining means of the robust digital control system for increasing a degree of approximation is not shown. Therefore, a great deal of trial-and-error processes for determining the parameters was needed, thus requiring a lot of labor hours. Consequently, a definite parameter determining means by which anyone can easily design a robust digital controller has been needed to realize.

In order to solve the forgoing problems, a patent document 1 discloses a design device of a robust digital controller which has a high-degree of approximation and is incorporated with a new two-degree-of-freedom robust digital control system not required to consider magnitude of its control input.

FIG. 6 is a block diagram very roughly illustrating the robust digital control system disclosed in the patent document 1. In the figure, a model matching system with a disturbance qy and state feedback is shown. The disturbance qy mentioned here means a variation in output voltage due to an abrupt change in load or the like.

In FIG. 6, numeral symbol 101 denotes a DC-DC converter, which is controlled by an output voltage controller 100 to output an output voltage $v_o$. In the present model matching system, this output voltage $v_o$ is shown as a result of having added, at an adding point 102, the disturbance qy to a voltage output from the DC-DC converter. Based on a given target value r, the output voltage controller 100 switching-controls switching elements, not shown, which make up the DC-DC converter 101 and so the output voltage $v_o$ is fed back in order that the output voltage $v_o$ becomes a desired voltage.

A transfer function $W_{qy}$ from the disturbance qy to the output voltage $v_o$ in the model matching system is expressed by the following formula.

$$W_{qy}(z) = \frac{Nm(z)}{Dm(z)} \quad \text{(Formula 5)}$$

where Nm(z) and Dm(z) denote a model matching system constant (a pole assignment is (H1 to H4)), and a function of a state feedback (f1 to f4) and constant of the DC-DC converter, respectively. The present model matching system is one for determining a response from the target value r to the output voltage $v_o$.

Nonpatent document 1: "Robust PWM power amplifier using only voltage feedback to be operated by an approximately two-degree-of-freedom integral control" in the academic journal of Institute of Electronics, Information and Communication Engineers of Japan, Vol. J-85-C, No. 10, pp. 1 to 11, written by Koji Higuchi, Kazushi Nakano, Kuniya Araki, Fumie Kayano"

Nonpatent document 2: "A secondary model realizing robust PWM power amplifier operated by an approximately two-degree-of-freedom integral controller" in the academic journal of Institute of Electronics, Information and Communication Engineers of Japan, Vol. J-88-C, No. 9, pp. 724 to 736, written by Eiji Takegami, Koji Higuchi, Kazushi Nakano, Satoshi Tomioka, Kazushi Watanabe"

Patent document 1: Japanese Unexamined Patent Application Publication No. 2006-50723

DISCLOSURE OF THE INVENTION

Problems to be Solved by the Invention

In the above formula 5, if varying a system constant so that a desired $W_{qy}$ is achieved, a response characteristic from the target value r to the voltage $v_o$ changes. Therefore, this model matching system is hard to use for the design of $W_{qy}$.

Consequently, using a robust controller shown in FIG. 7, a system is rebuilt up with $W_{ry}(z)=W_m(z)W_s(z)$, $K(z)=k_z/(z-1+k_z)$.

Wm is a transfer function of a design objective and $W_s(z)$ is designed to become approximately unity using a pole assignment theory. $W_{qy\_job}$ after rebuilding is expressed as follows:

$$W_{qy\_rob}(z) = \frac{W_{qy}(z)(z-1)}{z-1+k_zW_s(z)} \approx \frac{Nm(z)(z-1)}{Dm(z)(z-1+k_z)} \quad \text{(Formula 6)}$$

In the formula 6, the lower the frequency, the smaller value is desirable for $W_{qy}$. Accordingly, the higher the order of the numerator (z−1) of the formula 6 becomes, the better result is obtained. In other words, it is preferable that the zero point gets higher by an order of unity. Considering the characteristic of $W_{qy}$ by giving a specific example, when an order of (z−1) is unity, the characteristic shown in FIG. 8 is obtained to exhibit a 20 dB/dec tilt. (FIG. 8 has been extracted from the nonpatent document 2).

Therefore, in view of the problems described above, it is an object of the present invention to provide a digital controller which can reduce a variation in output voltage at the time of abrupt changes in load and input of a electric power supply as compared to the conventional digital controller.

Means for Solving the Problem

A first aspect of the present invention is a digital controller built in an electric power supply for supplying an output voltage $v_o$ to a load. The digital controller is equipped with a manipulated variable calculating unit configured to detect the output voltage $v_o$ to calculate a manipulated variable $\xi_1$ and a signal generating unit which converts the manipulated variable $\xi_1$ into a signal for making the electric power supply operate. Feedforward from an equivalent disturbance qy caused by a change in load is replaced by feedback elements from the output voltage $v_o$ and the manipulated variable $\xi_1$ thereby allowing a transfer characteristic from a disturbance qy to the output voltage $v_o$ to result in a quadratic differential characteristic.

Further, the manipulated variable calculating unit is configured to calculate the manipulated variable $\xi_1$ according to the formula 1.

This causes the variation in output voltage at the time of the abrupt changes in load and input of the electric power supply to be reduced as compared to the conventional digital controller.

Furthermore, a fifth aspect of the present invention is a digital controller in which the manipulated variable calculating unit is configured to omit each of the feedforward multipliers.

Moreover, a sixth aspect of the present invention is a digital controller in which the manipulated variable calculating unit is configured to omit so small parameters as to lightly affect a control system from among parameters used to calculate the manipulated variable $\xi_1$.

This causes a formula for calculating the manipulated variable $\xi_1$ to be simplified, enabling an arithmetic process to be speeded up and an arithmetic unit to be simplified.

Effects of the Invention

According to the first to fourth aspects of the present invention, an output capacitor in the electric power supply can be reduced in capacity, leading to a small size and low cost.

According to the fifth and sixth aspects of the present invention, manufacturing cost can be curbed by enabling high-speed digital control or by simplifying a configuration of the arithmetic unit.

BEST MODE FOR CARRYING OUT THE INVENTION

Hereunder is a description of preferred embodiments of a digital controller in the present invention with reference to accompanying drawings. The same reference numerals are used for parts the same as in a conventional example and descriptions for common parts are omitted to avoid overlapping as much as possible.

A transfer function $W_{qy}$ of a model matching system in the robust control according to the present invention is expressed as follows:

$$W_{qy}(z) = \frac{NH(z)}{DH(z)} \quad \text{(Formula 7)}$$

where NH(z), DH(z) are a model matching system constant (a pole assignment is (H1 to H4)) and a function of a parameter $k_q$ for a state feedback (f1 to f4), DC-DC converter constants (a, b) and adding a zero point, respectively.

NH(z) is expressed as $$NH(z) = z^3 - f_5z^2 + \frac{a_{12}b_{11}k_q - f_4a_{12}}{a_{12}}z + \frac{f_2b_{11} - f_3a_{12} - a_{12}a_{22}b_{11}k_q + a_{12}^2b_{21}k_q}{a_{12}} \quad \text{(Formula 8)}$$

where when NH(z)=0 is set, $k_q$ is given by the following formula:

$$k_q = \frac{-a_{12} + f_5a_{12} + f_4a_{12} + f_3a_{12} - f_2b_{11}}{a_{12}(b_{11} + a_{12}b_{21} - a_{22}b_{11})} \quad \text{(Formula 9)}$$

Substitution of the formula 9 into the formula 8 yields the following formula:

$$NH(z) = (z-1)\overline{NH}(z) \quad \text{(Formula 10)}$$

where $\overline{NH}(z)$ denotes remaining zero points of NH(z).

Substituting the formula 10 into the formula 7, the following formula is obtained.

$$W_{qy}(z) = \frac{\overline{NH}(z)(z-1)}{DH(z)} \quad \text{(Formula 11)}$$

As a result, the numerator (z−1) of $W_{qy}$ can be increased in order by using the parameter $k_q$ irrelevant to the model matching system. As being ineffective to the model matching system, the response characteristic from the target value r to the output voltage $v_o$, remains unchanged.

Then, the system is rebuilt by using the robust controller shown in FIG. 7. $W_{qy\_rob}$ subsequent to the rebuilding is expressed as the following formula:

$$W_{qy\_rob}(z) = \frac{W_{qy}(z-1)}{z-1+k_zW_s} = \frac{\overline{NH}(z)(z-1)^2}{DH(z)(z-1+k_z)W_s} \approx \frac{\overline{NH}(z)(z-1)^2}{DH(z)(z-1+k_z)} \quad \text{(Formula 12)}$$

In the formula 12, $W_s(z)$ is designed to become approximately unity using the pole assignment theory. As a result, the numerator (z−1) can be increased by one order. FIG. 4 shows the characteristic of $W_{qy}$ in the robust control according to the present invention. In FIG. 4, the characteristic of $W_{qy}$ exhibits a 40 dB/dec tilt due to the quadratic differential characteristic in the transfer function $W_{qy}$ from the equivalent disturbance qy to the output voltage $v_o$.

FIG. 1 is a circuit diagram showing a circuitry of a switching regulator mounted with the digital controller according to the present invention. In FIG. 1, a series circuit of switching elements 2, 3 comprising, e.g., MOSFETs is connected across a DC power source 1 with an input voltage $v_i$. Switching pulses inverted relative to each other are input from a robust digital controller 20 comprising, e.g., a DSP (Digital Signal Processor) to gates, acting as driving terminals of the switching elements 2, 3. As a result, these switching elements alternately conduct. A series circuit where a choke coil 5 and a smoothing capacitor 6 are coupled to each other is connected across a drain and source of the switching element 3. Both terminals of the smoothing capacitor 6 correspond to output terminals for outputting the output voltage $v_o$. Both terminals of the smoothing capacitor 6 are connected to a load device 9. Thus, electric power is supplied to the load device 9. Further, for performing remote sensing of a load voltage the robust digital controller 20 is connected with a load line connecting both the terminals of the capacitor 6 and the load device 9.

The robust digital controller 20 comprises an AD converter 21 which samples (discretizes) periodically an analogue signal such as the output voltage $v_o$ to convert the analogue signal into a digital signal, a manipulated variable calculating unit 22 which calculates a manipulated variable $\xi_1$ based on a feedback signal, that is, a digital signal discretized by the AD converter 21 and a target value r, and a PWM output unit 23 acting as a control output unit which produces a switching pulse, acting as a control pulse, depending on the manipulated variable $\xi_1$ to output the pulse to gates of switching elements 2, 3. Here, the PWM output unit 23 functions as a signal generating unit which converts the manipulated variable $\xi_1$ into a signal for activating the switching elements 2, 3. The robust digital controller 20 according to the present invention detects, by the AD converter 21, at least one point data of the output voltage $v_o$ or maximum two points' data including a choke coil output current $i_{Lf}$ in addition to the output voltage to determine the manipulated variable $\xi_1$ for control. The manipulated variable $\xi_1$ mentioned here corresponds to a duty of the switching pulse in the case of, e.g., PWM control and therefore the present invention can be applied to PFM control or the like, too. In the case of PFM control, the manipulated variable $\xi_1$ corresponds to a frequency of the switching pulse. Further, the present invention can be applied to all power supply devices whose load is connected with an LC filter and hence a reduction in noise of an output of a power supply device can be easily achieved.

Furthermore, in the present invention, a feedforward operation from an equivalent disturbance qy caused by a variation in load is replaced by a feedback operation from the output voltage $v_o$ and the manipulated variable $\xi_1$, thereby leading to a system configuration whose transfer function $W_{qy}$ from the disturbance qy to the output voltage $v_o$ becomes a quadratic differential characteristic.

With reference to FIG. 2, next is a description of a configuration of the manipulated variable calculating unit 22 which makes up a characterizing portion of the robust digital controller 20. FIG. 2 is a block diagram illustrating a fundamental configuration of a control system created by modeling an electric circuit system shown in FIG. 1. In addition, a robust digital control system described below is one approximately according to the international application PCT/JP2005/013834, which is based on Patent Corporation Treaty and is previously filed by the applicant of the present application. Accordingly, as for e.g., details in the state formula and each transfer component which are used for the control system, please refer to the specification on the international application.

Explaining a configuration of each section in the block diagram in FIG. 2, numeral symbol 30 denotes a controlled object component which satisfies the following state formula 13 when an input $u=\xi_1$ and a controlled variable y are given with regard to the output choke coil current $i_{Lf}$ and the output voltage $v_o$ which build up each element of a matrix x. Specifically, the controlled object component corresponds to a converter unit of a switching regulator.

$$\dot{x}_d = A_d x_d + B_d u$$

$$y = C_d x_d \quad \text{(Formula 13)}$$

For each of matrixes $A_d$, $B_d$, $C_d$, appropriate values are determined depending on the circuitry of the converter unit.

Meanwhile, a remaining part after excluding the controlled object component 30 corresponds to the manipulated value calculating unit 22 which builds up an integral control system and is used for the robust digital controller 20. The manipulated value calculating unit 22 comprises each of transfer components 31, 33, 44 each acting as a digital filter, a component 43 acting as an integrator with an order 1/(z−1), an adding point 32 acting as an adder, and an adding point 42 acting as a subtractor. Here, transfer functions $G_r$, $G_{vo}$, $G_e$ of the transfer components 31, 33, 44, respectively are expressed as the following formula 14.

$$G_r = \frac{k_{1r}z^2 + (k_{2r} - k_6 k_{1r})z + k_{3r} - k_6 k_{2r} - k_5 k_{1r}}{z^3 - k_6 z^2 - k_5 z - k_4}$$

$$G_{vo} = \frac{k_3 z^2 + (k_2 - k_3 k_6)z + k_1 - k_2 k_6 - k_3 k_5}{z^3 - k_6 z^2 - k_5 z - k_4}$$

$$G_e = \frac{k_{i1} z^2 + (k_{i2} - k_6 k_{i1})z + k_{i3} - k_6 k_{i2} - k_5 k_{i1}}{z^3 - k_6 z^2 - k_5 z - k_4}$$

(Formula 14)

where $G_r$: a transfer function from a load voltage target value r to the manipulated variable $\xi_1$, $G_{vo}$: a transfer function from the output voltage $v_o$ to the manipulated variable $\xi_1$, and $G_e$: a transfer function from a difference between the load voltage target value r and the output voltage $v_o$ to the manipulated variable $\xi_1$.

Consequently, the manipulated variable $\xi_1$ acting as an output from the adding point 32 is expressed as the following formula 15.

$$\xi_1 = \frac{1}{z^3 - k_6 z^2 - k_5 z - k_4} \left\{ \begin{array}{l} [k_3 z^2 + (k_2 - k_3 k_6)z + k_1 - k_2 k_6 - k_3 k_5]v_0 + \\ [k_{1r} z^2 + (k_{2r} - k_6 k_{1r})z + k_{3r} - k_6 k_{2r} - k_5 k_{1r}]r + \\ [k_{i1} z^2 + (k_{i2} - k_6 k_{i1})z + k_{i3} - k_6 k_{i2} - k_5 k_{i1}]\frac{1}{z-1}(r - v_0) \end{array} \right\} \quad \text{(Formula 15)}$$

where $z = \exp(j\omega t)$ and $k_{1r}$, $k_{2r}$, $k_{3r}$, $k_1$, $k_2$, $k_3$, $k_4$, $k_5$, $k_6$, $k_{i1}$, $k_{i2}$, $k_{i3}$ are parameters preset depending on the control system.

Giving a more detailed description of the fundamental configuration shown in FIG. 2, a transfer component 31 with the transfer function $G_r$ is coupled with the target value r defined as an input thereto, a feedback component 33 with the transfer function $G_{vo}$ is coupled with the output voltage $v_o$ defined as input thereto, a difference between the target value r and the output voltage $v_o$ is input from an adding point 42 to an integral component 43 with an order $1/(z-1)$, an output from the integral component 43 is input to a transfer component 44 with a transfer function $G_e$, outputs from the transfer components 44, 31 and from a feedback component 33 are added at the adding point 32, the output produced by performing the additions at the adding point 32 is applied to the controlled object component 30 with a delayed output $\xi_1$, caused by the calculation inside the robust digital controller 20, defined as an input thereto. Thus, the manipulated variable calculating unit 22 of the robust digital controller 20 is configured. In addition, each of the transfer components 31, 33, 44 may be able to be configured as a different manipulated variable calculating unit which performs calculation by using the transfer functions $G_r$, $G_{vo}$, $G_e$ for a target value r, an output voltage $v_o$, which have been input.

Since each of transfer components 31, 33, 44 shown in FIG. 2 is the same in configuration, these transfer components can be got into a form shown in FIG. 3. In FIG. 3, the manipulated variable calculating unit 22 comprises a combination of: a transfer components 50 to 61 acting as a multiplier having each of parameters $k_{1r}$, $k_{2r}$, $k_{3r}$, $k_1$, $k_2$, $k_3$, $k_4$, $k_5$, $k_6$, $k_{i1}$, $k_{i2}$, $k_{i3}$, delay components 65, 67, 69 each acting as a delay element with an order $1/z$ corresponding to one sampling time delay, an integral component 43 acting as an integrator with an order $1/(z-1)$, an adding point 42 acting as a subtractor, and adding points 64, 66, 68 each acting as an adder. In addition, among the parameters $k_{1r}$, $k_{2r}$, $k_{3r}$, $k_1$, $k_2$, $k_3$, $k_4$, $k_5$, $k_6$, $k_{i1}$, $k_{i2}$, $k_{i3}$, parameters having small values and therefore having negligible effects on the control system can be omitted. Consequently, a formula for calculation can be simplified to alleviate a calculation burden, thus enabling an arithmetic process to be speeded up and a calculating unit to be simplified.

Giving more detailed description of the configuration shown in FIG. 3, each of feedforward components $k_{1r}$, $k_{2r}$, $k_{3r}$, is coupled with the target value r defined as inputs thereto;

each of feedback components 53, 54, 55 with parameters $k_1$, $k_2$, $k_3$, respectively is coupled with the output voltage $v_o$, defined as inputs thereto;

a difference between the target value r and the output voltage $v_o$ is input from the adding point 42 to the integral component 43 with an order $1/(z-1)$;

an output from the integral component 43 is input to each of transfer components 59, 60, 61 with parameters $k_{i1}$, $k_{i2}$, $k_{i3}$, respectively.

outputs from the transfer component 61, a feedback component 53, each of feedback components 56, 57, 58 with the parameters $k_4$, $k_5$, $k_6$, and a feedforward component 52 are added at the adding point 64;

an output produced by the additions at the adding point 64 is input to a delay component 65 with an order $1/z$;

a delayed output from the delay component 65, and outputs from the feedback component 54, a feedforward component 51 and the transfer component 60 are added at the adding point 66;

an output produced by the addition at the adding point 66 is output to a delay component 67 with an order $1/z$;

a delayed output from the delay component 67 is input to the feedback component 57 with the parameter $k_5$, a delayed output from the delay component 67, and outputs from the feedback component 55, a feedforward component 50 and the transfer component 59 are added at the adding point 68;

an output produced by the additions at the adding point 68 is input to a delay component 69 with an order $1/z$, and a delayed output $\xi_1$ from the delay component 69 is input to the feedback component 56 with the parameter $k_4$ to be applied to the controlled object component 30. Thus, the manipulated variable calculating unit 22 of the robust digital controller 20 is configured.

In a block diagram in FIG. 6, when a disturbance qy is input, a controller with a transfer function $Cv(z)$ responds, resulting in a change in the manipulated variable $\xi_1$. Here, when an output voltage controller 100 is expressed by the transfer function in the present embodiment shown in FIG. 2, FIG. 5 is obtained. Each of the transfer components 31, 33, 44 with the transfer functions $G_r$, $G_{vo}$, $G_e$, respectively corresponds to the output voltage controller 100 shown in FIG. 6. The controlled object component 30 satisfying the state formula 13 corresponds to a DC-DC converter 101.

As a result, the response of the manipulated variable $\xi_1$ for the disturbance qy is expressed as the following formula.

$$\frac{\partial \xi_1(z)}{\partial qy} = G_{vo}(z) - \frac{1}{z-1} G_e(z) \quad \text{(Formula 16)}$$

Besides, in FIG. 5, when a transfer function of the DC-DC converter 101 is set as P(s), the transfer function $W_{qy\_rob}$ for qy to y in the present embodiment is expressed as the following formula:

$$W_{qy\_rob}(z) = \frac{1}{1 - \left(G_{vo}(z) - \frac{1}{z-1} G_e(z)\right) P(z)} \quad \text{(Formula 17)}$$

This formula is equal to the formula 12.

The switching regulator using the robust digital controller 20 thus obtained can reduce a variation in output voltage at the time of abrupt changes in load and input of the switching regulator as compared to the case where the conventional digital controller is used. Hence, the capacity of an output capacitor can be decreased, leading to reductions in size and cost of the switching regulator.

As described above, the robust digital controller 20 in the present embodiment is a digital controller built in a switching regulator acting as electric power supply for supplying an output voltage $v_o$ to a Toad device 9. The robust digital controller 20 is equipped with a manipulated variable calculating unit 22 which detects the output voltage $v_o$ to calculate the manipulated variable $\xi_1$ and the PWM output unit 23 acting as a signal generating unit which converts the manipulated variable $\xi_1$ into a signal for making the electric power supply operate.

Feedforward from the equivalent disturbance qy caused by a variation in load is replaced by feedback elements from the output voltage $v_o$ and the manipulated variable $\xi_1$, thereby allowing the characteristic of the transfer function $W_{qy}$ from the equivalent disturbance qy, to the output voltage $v_o$ to result in a quadratic differential characteristic.

Further, the manipulated variable calculating unit 22 is configured to calculate the manipulated variable $\xi_1$ according to the following formula 18.

$$\xi 1 = \frac{1}{z^3 - k_6 z^2 - k_5 z - k_4} \left\{ \begin{array}{l} [k_3 z^2 + (k_2 - k_3 k_6)z + k_1 - k_2 k_6 - k_3 k_5]v_0 + \\ [k_{1r} z^2 + (k_{2r} - k_6 k_{1r})z + k_{3r} - k_6 k_{2r} - k_5 k_{1r}]r + \\ [k_{i1} z^2 + (k_{i2} - k_6 k_{i1})z + k_{i3} - k_6 k_{i2} - k_5 k_{i1}]\frac{1}{z-1}(r - v_0) \end{array} \right\}$$
(Formula 18)

where $z = \exp(j\omega t)$, r is an arbitrary target value for the output voltage $v_o$, and $k_{1r}$, $k_{2r}$, $k_{3r}$, $k_1$, $k_2$, $k_3$, $k_4$, $k_5$, $k_6$, $K_{i1}$, $k_{i2}$, $K_{i3}$ are preset parameters.

Further, in the robust digital controller 20 according to the present embodiment, the manipulated variable calculating unit 22 comprises the transfer component 31 corresponding to a first digital filter with the transfer function $G_r$ shown in the formula 19 with the target value r defined as an input thereto, $$G_r = \frac{k_{1r} z^2 + (k_{2r} - k_6 k_{1r})z + k_{3r} - k_6 k_{2r} - k_5 k_{1r}}{z^3 - k_6 z^2 - k_5 z - k_4}$$
(Formula 19)

the transfer component 33 corresponding to a second digital filter with the transfer function $G_{vo}$ shown in the formula 20 with the output voltage $v_o$ defined as an input thereto, $$G_{vo} = \frac{k_3 z^2 + (k_2 - k_3 k_6)z + k_1 - k_2 k_6 - k_3 k_5}{z^3 - k_6 z^2 - k_5 z - k_4}$$
(Formula 20)

the adding point 42 acting as a subtractor which outputs a difference between the target value r and the output voltage $v_o$, the integral component 43 acting as an integrator which integrates the difference output from the adding point 42, the transfer component 44 corresponding to a third digital filter with the transfer function $G_e$ shown in the formula 21 with an output from the integral component 43, defined as an input thereto, $$G_e = \frac{k_{i1} z^2 + (k_{i2} - k_6 k_{i1})z + k_{i3} - k_6 k_{i2} - k_5 k_{i1}}{z^3 - k_6 z^2 - k_5 z - k_4}$$
(Formula 21)

and the adding point 32 acting as an adder which adds the outputs from the transfer components 31, 33, 44 to output the manipulated variable $\xi_1$.

Furthermore, with respect to the robust digital controller 20 according to the present embodiment, in the manipulated variable calculating unit 22, each of feedforward components 50, 51, 52 each acting as a feedforward multiplier which does each of multiplication of the parameters $k_{1r}$, $k_{2r}$, $k_{3r}$, respectively is coupled with the target value r defined as inputs thereto;

each of the feedback components 53, 54, 55 each acting as a feedback multiplier which does each of multiplications of the parameters $k_1$, $k_2$, $k_3$, respectively with the output voltage $v_o$ defined as inputs thereto;

the difference between the target value r and the output voltage $v_o$ is input from the adding point 42 acting as a subtractor to the integral component 43 acting as an integrator;

an output from the integral component 43 is input to each of the transfer components 59, 60, 61 each acting as a multiplier which does each of multiplications of the parameters $k_{i1}$, $k_{i2}$, $k_{i3}$, respectively, outputs from the transfer component 61 with the parameter $k_{i3}$, the feedback component 53 which does multiplication of the parameter $k_1$, each of the feedback components 56, 57, 58 each acting as a feedback multiplier which does each of multiplications of the parameters $k_4$, $k_5$, $k_6$, respectively, and the feedforward component 52 with the parameter $k_{3r}$ are added at the adding point 64 acting as a first adder;

an output produced by the additions at the adding point 64 is input to a delay component 65 acting as a first delay element which performs one sampling time delay;

a delayed output from the delay element 65 is input to the feedback element 58 with the parameter $k_6$;

a delayed output from the delay component 65 and outputs from the feedback component 54 with the parameter $k_2$, the feedforward component 51 with the parameter $k_{2r}$, and the transfer component 60 with the parameter $K_{i2}$ are added at the adding point 66 acting as a second adder;

an output produced by the additions at the adding point 66 is input to the delay component 67 acting as a second delay element which performs one sampling time delay;

a delayed output from the delay component 67 is input to the feedback component 57 with the parameter $k_5$;

a delayed output from the delay component 67 and outputs from the feedback element 55 with the parameter $k_3$, the feedforward component 50 with the parameter $k_{1r}$, and the transfer component 59 with the parameter $k_{i1}$ are added at the adding point 68 acting as a third adder;

an output produced by the additions at the adding point 68 is input to a delay component 69 acting as a third delay element which performs one sampling time delay; and a delayed output $\xi_1$ from the delay component 69 is input to the feedback component 56 with the parameter $k_4$ to be output as the manipulated variable $\xi_1$. Thus, the manipulated variable calculating unit 22 is configured.

Consequently, a variation in output voltage at the time of abrupt changes in load and input of the power amplifier can be reduced as compared to the conventional amplifier. Accordingly, an output capacitor of the electric power supply can be reduced in capacity, leading to reductions in size and cost of the electric power supply.

Further, in the robust digital controller 20 according to the present embodiment, the manipulated variable calculating unit 22 may be configured with each of the feedforward elements 50, 51, 52 omitted.

Furthermore, in the robust digital controller 20 according to the present embodiment, the manipulated variable calculating unit 22 may be configured with small-numerical-value parameters, having negligible effects on the control system, omitted from among the parameters $k_{1r}, k_{2r}, k_{3r}, k_2, k_3, k_4, k_5, k_6, k_{i1}, k_{i2}, k_{i3}$.

Consequently, a formula for calculating the manipulated variable $\xi_1$ is simplified, leading to speeding-up of the arithmetic process and simplification of the calculating unit. Hence, manufacturing cost of the controller can be curbed by enabling its high-speed digital control and simplifying a configuration of its calculating unit.

In addition, the present invention is not limited to the embodiments described above and various modifications are possible within departing from the gist of the present invention. For example, as the converter configuration, shown in FIG. 1, intended for a controlled object, various types of converters such as an isolation type converter using a transformer, a converter including a plurality of switching elements (e.g., a half-bridge converter, a full-bridge converter or the like) can be applied. Further, the digital controller according to the present embodiment can be applied to every device in which feedback control is performed.

Figure 1:
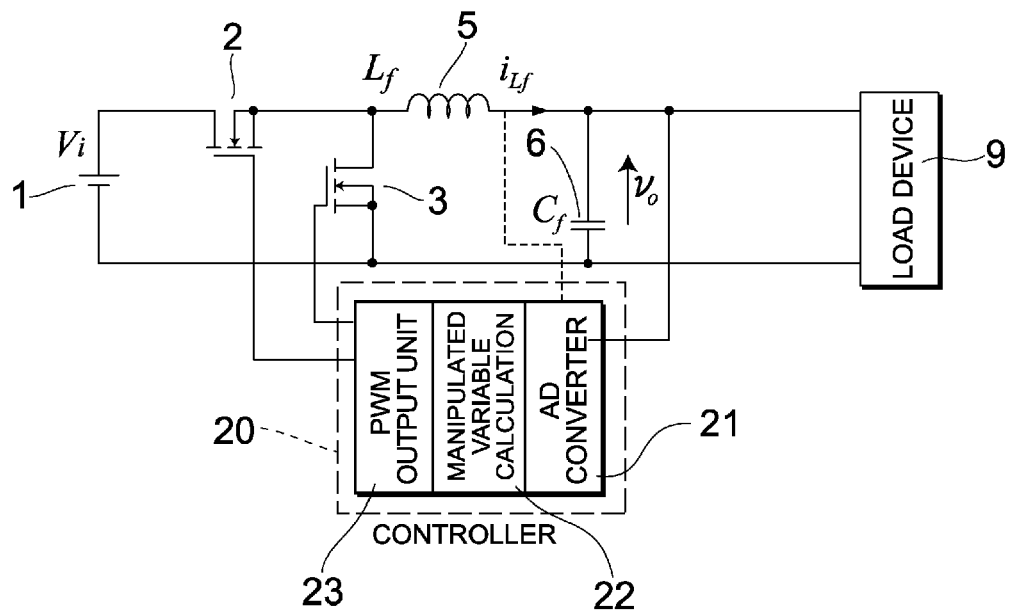
FIG. 1 is a circuit diagram illustrating a configuration of a switching regulator mounted with a digital controller according to the present invention.
Figure 2:
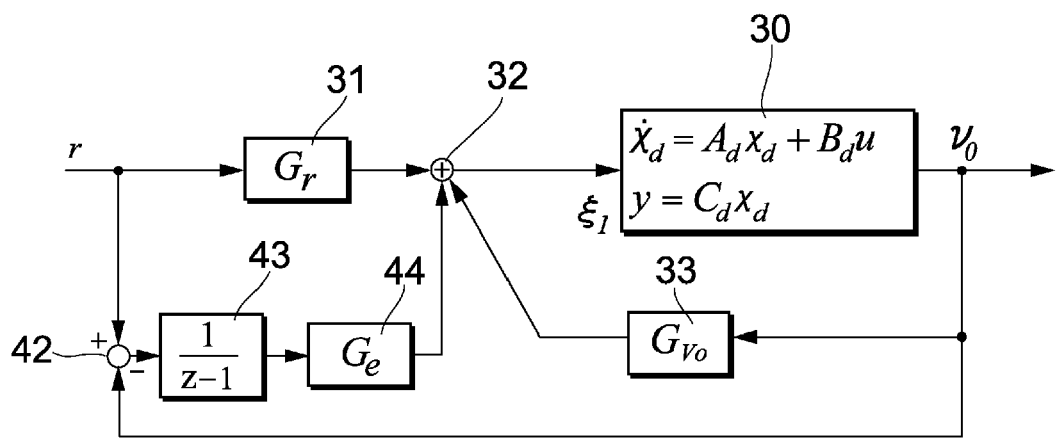
FIG. 2 is a block diagram illustrating a control system of the digital controller according to the present invention.
Figure 3:
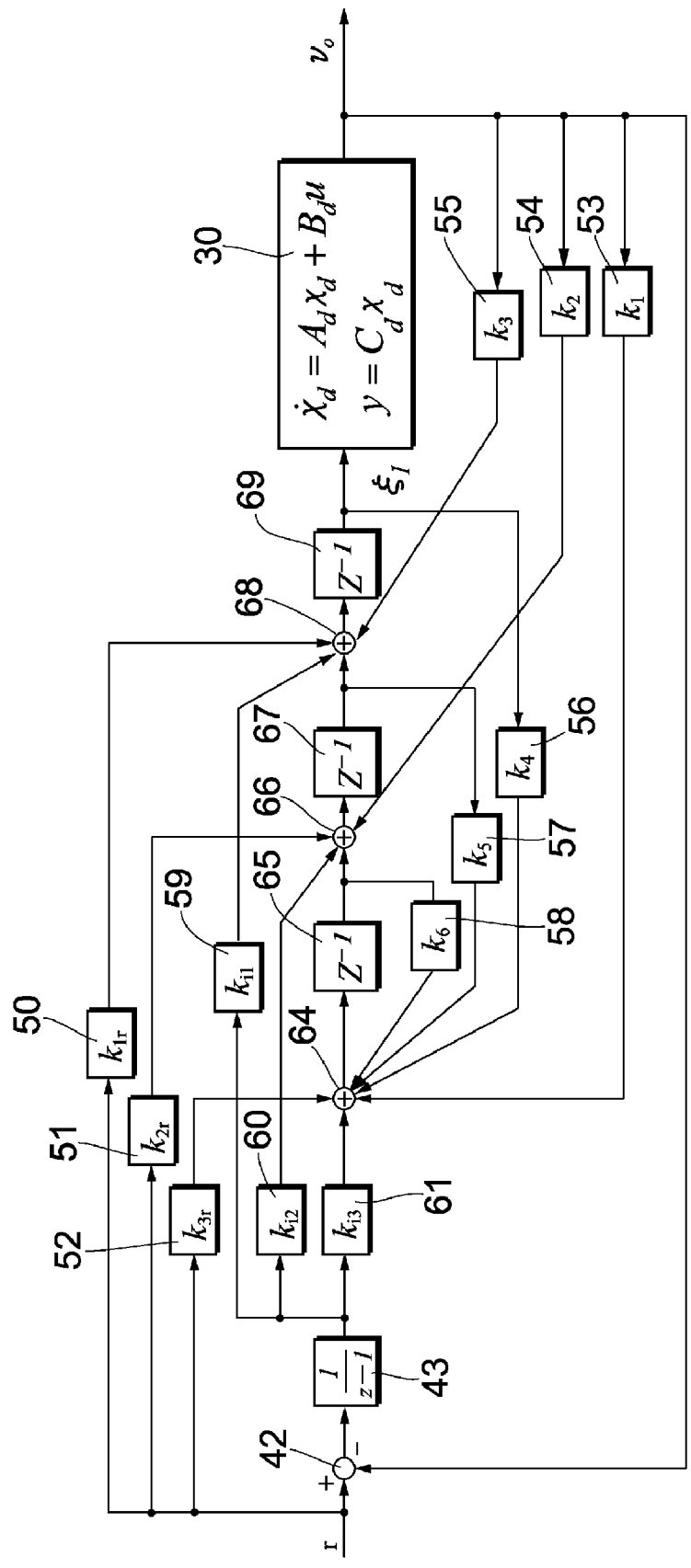
FIG. 3 is a block diagram illustrating a modified example in which the block diagram in FIG. 2 is equivalently converted.
Figure 4:
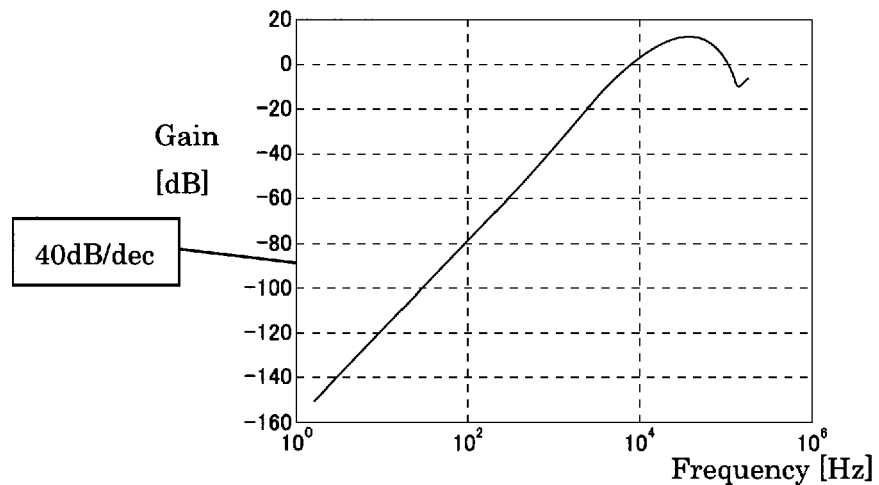
FIG. 4 is a characteristic diagram illustrating a characteristic of a transfer function $W_{qy}$ of the digital controller according to the present invention.
Figure 5:
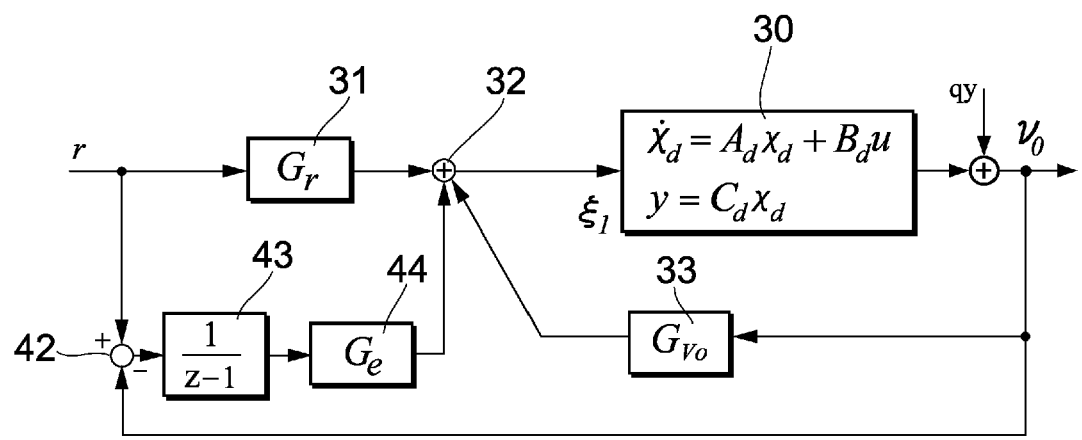
FIG. 5 is a block diagram illustrating a control system of the digital controller which introduced disturbance qy according to the present invention.
Figure 6:
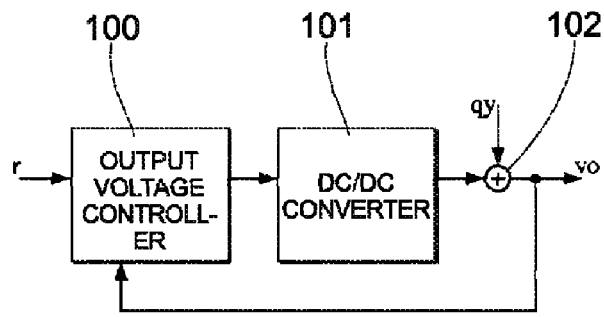
FIG. 6 is a block diagram illustrating very schematically a robust digital control system in a conventional example.
Figure 7:
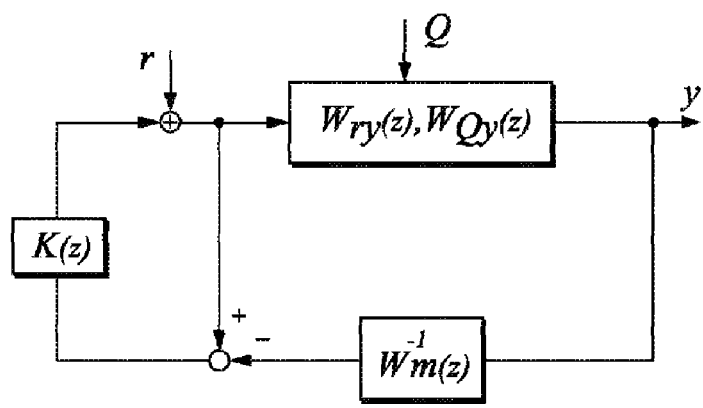
FIG. 7 is a block diagram highly schematically illustrating a different robust digital control system in a conventional example.
Figure 8:
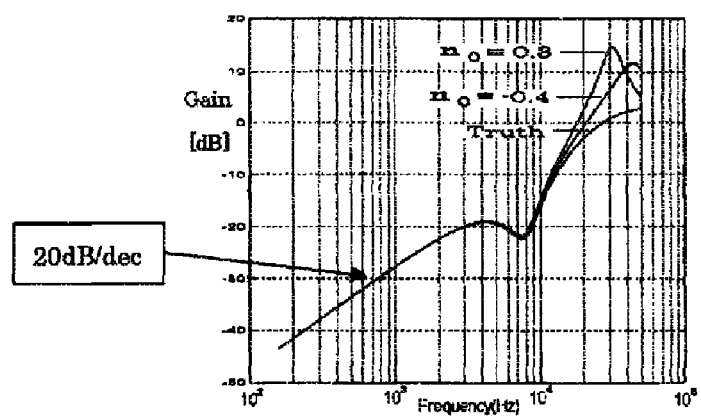
FIG. 8 is a characteristic diagram illustrating a characteristic of the transfer function $W_{qy}$ according to the present invention.

DESCRIPTION OF THE REFERENCE NUMERALS 9 load device
20 robust digital controller
22 manipulated variable calculating unit
23 PWM output unit (signal generating unit)
31 transfer components (first digital filter)
32 adding point (adder)
33 transfer components (second digital filter)
42 adding point (subtractor)
43 integral component (integrator)
44 transfer components (third digital filter)
50 to 52 feedforward components (feedforward multiplier)
53 to 58 feedback components (feedback multiplier)
59 to 61 transfer components (multiplier)
64 adding point (first adder)
65 delay component (first delay element)
66 adding point (second adder)
67 delay component (second delay element)
68 adding point (third adder)
69 delay component (third delay element)

The invention claimed is:

1. A digital controller built in an electric power supply for supplying an output voltage $v_o$ to a load, comprising:
a manipulated variable calculating unit configured to detect said output voltage $v_o$ to calculate a manipulated variable $\xi_1$,
a signal generating unit which converts said manipulated variable $\xi_1$ into a signal for activating said electric power supply, wherein
said manipulated variable calculating unit is configured to replace a feedforward function from an equivalent disturbance qy caused by a variation in said load by a feedback elements from said output voltage $v_o$ and said manipulated variable $\xi_1$, thereby allowing a transfer characteristic from said disturbance qy to said output voltage $v_o$ to result in a quadratic differential characteristic.

2. The digital controller according to claim 1, wherein said manipulated variable calculating unit is configured to calculate the manipulated variable $\xi_1$ according to the following formula:

$$\xi 1 = \frac{1}{z^3 - k_6 z^2 - k_5 z - k_4} \quad \text{(Formula 1)}$$

$$\left\{ \begin{array}{l} [k_3 z^2 + (k_2 - k_3 k_6)z + k_1 - k_2 k_6 - k_3 k_5]v_0 + \\ [k_{1r} z^2 + (k_{2r} - k_6 k_{1r})z + k_{3r} - k_6 k_{2r} - k_5 k_{1r}]r + \\ [k_{i1} z^2 + (k_{i2} - k_6 k_{i1})z + k_{i3} - k_6 k_{i2} - k_5 k_{i1}]\frac{1}{z-1}(r - v_0) \end{array} \right\}$$

(where $z = \exp(j\omega t)$, r is an arbitrary target value with respect to the output voltage $v_o$, and $k_{1r}, k_{2r}, k_{3r}, k_1, k_2, k_3, k_4, k_5, k_6, k_{i1}, k_{i2}, k_{i3}$ are preset parameters).

3. The digital controller according to claim 2, wherein said manipulated variable calculating unit comprising:
a first digital filter configured to have a transfer function $G_r$ expressed by the following formula 2 with said target value r defined as an input thereto, $$G_r = \frac{k_{1r} z^2 + (k_{2r} - k_6 k_{1r})z + k_{3r} - k_6 k_{2r} - k_5 k_{1r}}{z^3 - k_6 z^2 - k_5 z - k_4} \quad \text{(Formula 2)}$$

a second digital filter configured to have a transfer function $G_{vo}$ expressed by the following formula 3 with said output voltage $v_o$ defined as an input thereto, $$G_{vo} = \frac{k_3 z^2 + (k_2 - k_3 k_6)z + k_1 - k_2 k_6 - k_3 k_5}{z^3 - k_6 z^2 - k_5 z - k_4} \quad \text{(Formula 3)}$$

a subtractor configured to output a difference between said target value r and said output voltage $v_o$,
an integrator configured to integrate said difference output from said subtractor, a third digital filter configured to have a transfer function $G_e$ expressed by the following formula 4 with an output, from said integrator, defined as an input thereto, $$G_e = \frac{k_{i1}z^2 + (k_{i2} - k_6 k_{i1})z + k_{i3} - k_6 k_{i2} - k_5 k_{i1}}{z^3 - k_6 z^2 - k_5 z - k_4}$$ (Formula 4)

and an adder configured to add outputs from said first to third digital filters to output a manipulated variable $\xi_1$.

4. The digital controller according to claim 3, wherein said manipulated variable calculating unit is configured with small-numerical-value parameters, having negligible effects on a control system, omitted from among the parameters $k_{1r}$, $k_{2r}$, $k_{3r}$, $k_1$, $k_2$, $k_3$, $k_4$, $k_5$, $k_6$, $k_{i1}$, $k_{i2}$, $k_{i3}$.

5. The digital controller according to claim 2, wherein said manipulated variable calculating unit is configured such that:

feedforward multipliers are configured to do multiplications of said parameters $k_{1r}$, $k_{2r}$, $k_{3r}$, with said target value r defined as inputs thereto, feedback multipliers are configured to do multiplications of said parameters $k_1$, $k_2$, $k_3$ with said output voltage $v_o$ defined as inputs thereto, a difference between said target value r and said output voltage $v_o$ is input from a subtractor to an integrator, an output from said integrator is input to multipliers configured to do multiplications of said parameters $k_{i1}$, $k_{i2}$, $k_{i3}$, a first adder is configured to add outputs from the multiplier configured to have said parameter $k_{i3}$, the feedback multiplier configured to do multiplication of said parameter $k_1$, feedback multipliers configured to do multiplications of said parameters $k_4$, $k_5$, $k_6$, and the feedforward multiplier configured to have said parameter $k_{3r}$, an output produced by the additions in said first adder is input to a first delay element configured to perform one sampling time delay, a delayed output from said first delay element is input to the feedback multiplier configured to have said parameter $k_6$, a second adder configured to add a delayed output from said first delay element and output from, the feedback multiplier configured to have said parameter $k_2$, the feedforward multiplier configured to have said parameter $k_{2r}$, and the multiplier configured to have said parameter $k_{i2}$, an output produced by the additions in said second adder is input to a second delay element configured to perform one sampling time delay, a delayed output from said second delay element is input to the feedback multiplier configured to have said parameter $k_5$, a third adder is configured to add a delayed output from said second delay element and outputs from the feedback multiplier configured to have said parameter $k_3$, the feedforward multiplier configured to have said parameter $k_{1r}$, and the multiplier configured to have said parameter $k_{i1}$, an output produced by the additions in said third adder is input to a third delay element configured to perform one sampling time delay, and a delayed output $\xi_1$ from said third delay element is input to the feedback multiplier configured to have said parameter $k_4$ and is output as a manipulated variable $\xi_1$.

6. The digital controller according to claim 5, wherein said manipulated variable calculating unit is configured with said feedforward multipliers omitted.

7. The digital controller according to claim 6, wherein said manipulated variable calculating unit is configured with small-numerical-value parameters, having negligible effects on a control system, omitted from among the parameters $k_{1r}$, $k_{2r}$, $k_{3r}$, $k_1$, $k_2$, $k_3$, $k_4$, $k_5$, $k_6$, $k_{i1}$, $k_{i2}$, $k_{i3}$.

8. The digital controller according to claim 5, wherein said manipulated variable calculating unit is configured with small-numerical-value parameters, having negligible effects on a control system, omitted from among the parameters $k_{1r}$, $k_{2r}$, $k_{3r}$, $k_1$, $k_2$, $k_3$, $k_4$, $k_5$, $k_6$, $k_{i1}$, $k_{i2}$, $k_{i3}$.

9. The digital controller according to claim 2, wherein said manipulated variable calculating unit is configured with small-numerical-value parameters, having negligible effects on a control system, omitted from among the parameters $k_{1r}$, $k_{2r}$, $k_{3r}$, $k_1$, $k_2$, $k_3$, $k_4$, $k_5$, $k_6$, $k_{i1}$, $k_{i2}$, $k_{i3}$.

* * * * *